United States Patent [19]

Redelius

[11] Patent Number: 5,521,235
[45] Date of Patent: May 28, 1996

[54] BITUMEN EMULSION AND ITS USE

[75] Inventor: Gösta Redelius, Nynäshamn, Sweden

[73] Assignee: Aktiebolaget Nynas Petroleum, Johanneshov, Sweden

[21] Appl. No.: 281,189

[22] Filed: Jul. 27, 1994

Related U.S. Application Data

[63] Continuation-in-part of Ser. No. 939,728, Sep. 2, 1992, abandoned.

[51] Int. Cl.$^6$ .............................. C08K 5/01; C08K 75/08; C08K 95/00
[52] U.S. Cl. ................. 524/61; 524/59; 524/60; 524/801; 524/839; 106/277
[58] Field of Search .................. 106/277; 524/59, 524/60, 61, 839, 801

[56] References Cited

U.S. PATENT DOCUMENTS

| | | | |
|---|---|---|---|
| 2,862,830 | 12/1958 | Mertens et al. | 106/277 |
| 3,979,916 | 9/1976 | Califano et al. | 524/59 |
| 4,810,298 | 3/1989 | Kumasaka et al. | 521/101 |
| 4,822,427 | 4/1989 | Graf et al. | 106/502 |
| 4,879,326 | 11/1989 | Demangeon et al. | 524/55 |

FOREIGN PATENT DOCUMENTS

| | | | |
|---|---|---|---|
| 0219399 | 4/1987 | European Pat. Off. | |
| 2050363 | 3/1987 | Japan | 524/60 |

OTHER PUBLICATIONS

"Associative Thickeners and The Rheological Influence on Trade–Sale Formulations" by J. E. Glass et al., Org. Coat. Appl. Polym. Sci. Proc., 47, 1982, pp. 498–502.

Primary Examiner—Paul R. Michl
Assistant Examiner—Andrew E. C. Merriam
Attorney, Agent, or Firm—Lowe, Price, LeBlanc & Becker

[57] ABSTRACT

A bitumen emulsion of the cationic type is disclosed which contains a thickener comprising at least one substance selected from the group consisting of associative thickeners of the nonionic type. The invention also relates to the use of a thickener of the above mentioned type as a thickener in a bitumen emulsion of the cationic type and the use of a bitumen emulsion containing a thickener as set forth above in road building, roofing and waterproofing.

4 Claims, No Drawings

BITUMEN EMULSION AND ITS USE

This is a continuation-in-part of application Ser. No. 07/939,728, filed on Sep. 2, 1992, which is now abandoned.

The present invention relates to a bitumen emulsion of the cationic type containing a thickener, the use of said bitumen emulsion in road building, roofing and waterproofing and the use of a certain group of substances as a thickener in said bitumen emulsion.

A frequent problem when preparing cold mix asphalt of a stone material (aggregate) and a cationic bitumen emulsion is that the emulsion runs off the stones resulting in a very thin layer of the bituminous binder on the stone surface. This problem is particularly troublesome when working with socalled open graded mixes, i.e. mixes based on a stone material which has an open gradation. The thin layers of binder results in a poor stability of the mix and the mix becoming sensitive to aging.

Several different methods have been tried in order to dissolve this problem. The most frequent one comprises mixing a smaller amount of fine stone material into the bitumen emulsion in order to thicken said emulsion. A disadvantage of this technique, however, is that the emulsion breaks against the stone material resulting in a mix which is very stiff and difficult to spread on the road.

Other methods of thickening the emulsion is to thicken the aqueous phase by means of additives such as carboxy methyl cellulose, polyvinylpyrrolidone, methoxy cellulose, etc. However, all these methods have the short-coming that the additive will absorb water and/or will have a negative influence upon the breaking of the emulsion.

A prerequisite of the thickeners functioning in acid cationic emulsions of the type which is the most common one for bitumen is that they are nonionic or possibly cationic.

Another method which has been used for a long time past is to use anionic emulsions which can be manufactured with a very high viscosity by proper selection of emulsifiers. A name for this type of emulsions is "High float emulsions". The disadvantage of this type is that it breaks very slowly and for that reason is unsuited in areas where there are substantial risks for rain (e.g. in Sweden).

According to the present invention we have developed a method wherein a type of thickener is used which interferes with the emulsifier on the surface of the bitumen drops and forms a network which renders the emulsion a high pseudoviscosity. However, the network is not so stable that it prevents the emulsion from floating out over the stone surface to form thick layers. The thickener belongs to a group which by a common name is called "associative thickeners". Such thickeners have the general structure "hydrophobic-hydrophilic-hydrophobic". For information on this group of thickeners, vide e.g. "Associative Thickeners and Their Rheological Influence on Trade-Sale Formulations" by J. E. Glass et al., Org. Coat. Appl. Polym. Sci. Proc., 47, 1982, pp 498–502.

Accordingly the bitumen emulsion of the cationic type containing a thickener according to the invention is characterized in that the thickener comprises at least one substance selected from the group consisting of associative thickeners of the nonionic type.

According to an embodiment of the bitumen emulsion according to the present invention the associative thickeners of the nonionic type are hydrophobically modified urethane ethoxylates, preferably urethane ethoxylates which have the general formula (I):

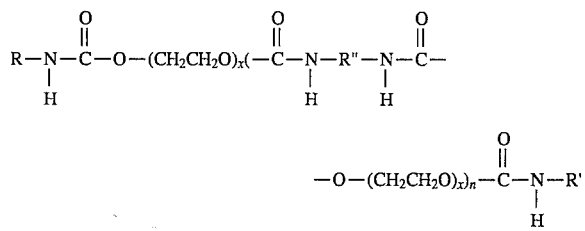

wherein

R and R' are the same or different and each represents a straight or branched alkyl group of 12–18 carbon atoms, R" is a saturated or unsaturated hydrocarbon chain of 7–36 carbon atoms, part of which chain may be closed to form a ring therein, x is a number 90–500, and n is an integer 1–4.

The concentration of the thickener in the bitumen emulsion depends upon the specific thickener used on one hand and the specific bitumen emulsion on the other. In general the concentration of the thickener will be within the range of 0.05–1% by weight calculated on the weight of the bitumen emulsion. The proper concentration in each individual case is preferably established by means of a series of simple experiments using varying concentrations of the thickening agent.

The bitumen emulsion according to the invention can be prepared by mixing the thickener and a standard bitumen emulsion of the cationic type using conventional mixing methods for bitumen products.

The standard bitumen emulsions of the cationic type to be used as the starting materials for the preparation of the bitumen emulsions according to the present invention generally comprises a bitumen residue of 50–70% by weight calculated on the total weight of the emulsion (starting material).

The emulsifier used in the bitumen emulsions used as starting material for the emulsions according to the present invention is not critical. Examples of emulsifiers occurring in bitumen emulsions of the cationic type are, for instance, fatty diamines, quarternary ammonium compounds, ethoxylated amines, amidoamines and imidazolines.

According to the preferred embodiment of the bitumen emulsion according to the present invention said bitumen emulsion has a breaking additive supplied thereto in the form of a water-in-oil emulsion wherein an aqueous solution of a neutralizing substance is dispersed in an oil continuous phase.

The term "neutralizing substance" is used here and in the claims to designate a substance which has a neutralizing effect upon the bitumen emulsion of the cationic type when added thereto.

The neutralizing substance is preferably selected from the group consisting of organic bases, basic salts of organic or inorganic acids and alkali metal hydroxides, which bases, salts or hydroxides are soluble in water but sparingly soluble or insoluble in oil.

Examples of such substances are organic bases such as low molecular amines, e.g. monoethanolamine, diethanoiamine, triethanolamine and aminopropanol; basic salts of organic acids, e.g. trisodium citrate; basic salts of inorganic acids such as sodium carbonate, sodium borate, sodium silicate and trisodium phosphate; and alkali metal hydroxides such as sodium or potassium hydroxide.

The neutralizing substance is preferably dispersed in a mineral oil or in a solvent of the type petroleum naphtha.

The emulsifier to be used for emulsifying the solution of the neutralizing substance in the oil should be of the nonionic type and have a HLB-value (Hydrophilic-Lipophilic Balance) within the range of 3–9, preferably 5–7.

Suitable amounts and compositions of the breaking additive for different purposes and effects are easily established in a series of experiments. However, in general the amount of said additive will be 1–10, preferably 1.5–6 and especially 2–4% by weight, calculated on the total weight of the final bitumen emulsion.

According to another aspect of the present invention the invention also relates to the use of an associative thickener of the nonionic type as a thickener in a bitumen emulsion of the cationic type.

The associative thickener of the nonionic type can be a hydrophobically modified methane ethoxylate, preferably a modified urethane ethoxylate of the general formula I above, wherein R, R', R", x and n are as defined previously.

According to still another aspect of the present invention the invention relates to the use of the bitumen emulsion according to the invention in road building, road maintenance or in construction work such as roofing, coating and waterproofing.

According to a preferred embodiment of this aspect of the invention a water-in-oil emulsion comprising an aqueous solution of a neutralizing substance dispersed in an oil continuous phase is mixed into the bitumen emulsion before or in connection with the use of said bitumen emulsion.

The invention is further illustrated by the following examples to which it is not limited.

EXAMPLE 1

A. An average breaking bitumen emulsion of the cationic type comprising 60% by weight calculated on the total weight of the emulsion of a distilled bitumen (commercial product, trade name BE60M from Nynäs Bitumen AB, Johanneshov, Sweden) was charged into a vessel provided with a stirrer. A hydrophobically modified urethane ethoxylate (Collacral PU 75 from BASF, Ludwigshafen, Germany) was added with stirring.

The viscosity of the emulsion containing additive was measured with a Brookfield viscometer equipped with a spindle No. 4. The sample was tested at a speed of 5 rpm.

Three different concentrations of the additive were used viz. 0.1, 0.2 and 0.4% by weight calculated on the total weight of the emulsion. As a comparison the viscosity of the emulsion without additive was also tested.

B. The procedure of part A was repeated but using another hydrophobically modified urethane ethoxylate (Collacral PU 85 from BASF, Ludwigshafen, Germany) as the additive.

The results from the viscosity tests are reported in Table 1 below.

EXAMPLE 2

Example 1 was repeated but using an average breaking bitumen emulsion of the cationic type comprising 67% by weight calculated on the total weight of the emulsion of a distilled bitumen (commercial product, trade name BE65M from Nynäs Bitumen AB, Johanneshov, Sweden) instead of the emulsion of Example 1 and using the following hydrophobically modified urethane ethoxylates in varying amounts as additives.

A. Collacral PU75 from BASF, Ludwigshafen, Germany.

B. Collacral PU85 from BASF, Ludwigshafen, Germany.

C. Acrysol RM 8 from Rohm and Haas, Philadelphia, USA

D. Bermodol PUR2100 from Berol Nobel AB, Stockholm, Sweden.

E. Collacral DS 6049 from BASF, Ludwigshafen, Germany.

The results are reported in Table 1 below.

EXAMPLE 3

Example 1 was repeated but using a rapidly breaking bitumen emulsion of the cationic type comprising 67% by weight calculated on the total weight of the emulsion of a polymer modified bitumen (commercial product, trade name PME 89 from Nynäs Bitumen AB, Johanneshov, Sweden) instead of the emulsion of Example 1. The same additives as in Example 1 were used, i.e.

A. Collacral PU75 from BASF, Ludwigshafen, Germany

B. Collacral PU85 from BASF, Ludwigshafen, Germany

The results are reported in Table 1 below.

EXAMPLE 4

Example 1 was repeated but using a rapidly breaking bitumen enulsion of the cationic type comprising 67% by weight calculated on the total weight of the emulsion of a distilled bitumen (commercial product, trade name BE65R from Nynäs Bitumen AB, Johannesbov, Sweden) instead of the emulsion of Example 1. The same addition as in Example 1 were used, i.e.

A. Collacral PU 75 from BASF, Ludwigshafen, Germany.

B. Collacral PU 85 from BASF, Ludwigshafen, Germany.

The results are reported in Table 1 below.

TABLE 1

| Additive | | Viscosity (Pa · s) for emulsion according to Example No. | | | |
|---|---|---|---|---|---|
| Amount % (w/w) | Type | 1 | 2 | 3 | 4 |
| — | none | 0.6 | 1.6 | 0.6 | 1.8 |
| 0.05 | A | | 13.2 | | |
| 0.05 | B | | 12.4 | | |
| 0.1 | A | 2.6 | 14.4 | 8.0 | 4.0 |
| 0.1 | B | 2.8 | 14.8 | 10.4 | 5.2 |
| 0.2 | A | 6.4 | 14.0 | 12.8 | 4.8 |
| 0.2 | B | 4.0 | 12.8 | 14.0 | 6.0 |
| 0.2 | C | | 3.6 | | |
| 0.2 | D | | 5.4 | | |
| 0.2 | E | | 5.2 | | |
| 0.4 | A | 4.8 | 15.4 | 12.0 | 4.8 |
| 0.4 | B | 6.8 | 17.2 | 16.8 | 6.0 |
| 0.4 | C | | 8.4 | | |
| 0.4 | D | | 17.2 | | |
| 0.4 | E | | 23.8 | | |

Notes to the additives (cf Examples 1–4):
A: Collacral PU 75
B: Collacral PU 85
C: Acrysol RM 8
D: Bermodol PUR 2100
E: Collacral DS 6049.

EXAMPLE 5

Using the procedure of Example 1 a mixture was prepared from the starting bitumen emulsion of Example 2 (BE65M from Nynäs Bitumen AB, Johanneshov, Sweden) and each of the additives A. to E. specified in Example 2 added in an amount of 0.2% by weight calculated on the weight of the emulsion.

A mix between mineral aggregates and each of the bitumen emulsions containing additive was made using 500 g aggregates. Farsta granite 0–16 mm filling the requirements for asphalt emulsion concrete with stone size 0–16 mm open curve, set forth by the Road Administration, Sweden, in "Byggnadstekniska föreskrifter och allmänna råd" ("Structural engineering directions and general advices") wet with 1% by weight of water. 7% by weight (calculated on the weight of aggregates) bitumen emulsion was added and the mix was stirred by hand for 72 sec. The mix was then poured into a funnel having a sieve in the bottom for "Run off" and "Wash off" tests.

"Run off" is the amount of material which is collected in a tared aluminium container under the funnel during 30 min. The container is dried in an oven at 110° C. The amount of "Run off" is reported as the percentage of lost binder calculated on the batch aggregate weight.

The residue sample in the funnel is then used for "Wash off" test which is carried out as follows.

After 1 h 200 ml of water is poured over the sample in the funnel and the elute is collected in a tared aluminium container. The content is dried in an oven at 110° C. and weighed. The amount of "Wash off" is reported as lost binder in % by weight in the same way as "Run off". The procedure is described in "A Basic Asphalt Emulsion Manual" from Asphalt Institute, College Park, Md., USA.

The results from the above tests and a comparative test using emulsion with no additive are reported in the following Table 2.

TABLE 2

| Additive | "Run off" (% (w/w)) | "Wash off" (% (w/w)) |
| --- | --- | --- |
| None | 0.56 | 0.64 |
| Collacral PU 75 | none | 0.40 |
| Collacral PU 85 | none | 0.42 |
| Acrysol RM8 | 0.04 | 0.82 |
| Bermodol PUR 2100 | 0.17 | 0.55 |
| Collacral DS 6049 | 0.30 | 0.59 |

From the results it may be concluded that the additives prevent or reduce "Run off" but have no deleterious influence on the breaking of the emulsions.

The results indicate that by utilizing an emulsion according to the invention it will be possible to use higher concentrations of bitumen binder in a cold mix asphalt and accordingly cold mix technique can be used for preparing asphalt mixes for roads of higher traffic intensity and longer length of service than has hitherto been possible.

EXAMPLE 6

To an average breaking bitumen emulsion of the cationic type comprising 67% by weight calculated on the total weight of the emulsion of a distilled bitumen (commercial product, trade name BE 65M from Nynäs Bitumen AB, Johanneshov, Sweden) was added 2.1% by weight, calculated on the weight of the bitumen emulsion, of a mixture of a breaking additive and a hydrophobically modified urethane ethoxylate (Collacral PU 75 from BASF, Ludwigshafen, Germany) in a weight ratio of 20:1.

The breaking additive was in the form of a water-in-oil emulsion consisting of an oil phase consisting of a solution of Hypermer A60 (commercial product from ICI Europe Ltd., Kortenberg, Belgium) in a concentration of 6.6% (w/w), Diamin BG (commercial product from Scanroad AB, Nacka, Sweden) in a concentration of 0.33% (w/w) and Viscoplex BA9-700 (commercial product from Röhm GmbH, Darmstadt, Germany) in a concentration of 0.66% (w/w) in a hydrotreated naphthenic oil (standard quality Nytex 800 from Nynäs Naphthenics AB, Nynäshamn, Sweden) and an aqueous phase consisting of an aqueous solution comprising 8% (w/w) of sodium carbonate and 16% (w/w) of trisodium citrate, said water-in-oil emulsion comprising 70% by weight of water.

The mixture of breaking additive and thickener was mixed in the bitumen emulsion by stirring with a glass rod immediately before adding 50 g of the emulsion to 500 g of mineral aggregates with a so-called open size distribution. The aggregate-emulsion mix was mixed for 60 sec with a steel spatula and poured into a plastics funnel with a sieve in the bottom for "Run off" and "Wash off" tests.

In this case there was no "Run off" during 30 min. (A few drops of clear water could be seen but there was no bitumen therein).

After 1 h the mix was tested for "Wash off" by pouring 200 ml of water over the mix. There was no "Wash off" (clear water ran out from the funnel).

EXAMPLE 7

Example 1 was repeated but using a slowly breaking cationic bitumen emulsion comprising 66% by weight, calculated on the total weight of the emulsion of bitumen (trade name P92-212-01 from Nynäs Bitumen AS, Johannesbov, Sweden) instead of the emulsion of Example 1 and using the following associative thickeners in varying amounts as additives:

1. Atlas G1822 from ICI Europe Ltd, Kortenberg, Belgium.

2. Atlas G1823 from ICI Europe Ltd, Kortenberg, Belgium.

The chemical structure of both products is polyethyleneglycol (150) distearate.

The viscosity of the emuulsion containing the additive was measured with a Brookfield viscosimeter equipped with a spindle No LV2. The sample was tested at a speed of 6 rpm at a temperature of 40° C.

The results are reported in Table 3 below.

TABLE 3

| Additive | | Viscosity |
| --- | --- | --- |
| Type | Amount (% (w/w)) | [mPa · s] |
| No additive | 0 | 420 |
| 1 | 0.1 | 480 |
| 1 | 0.2 | 900 |
| 1 | 0.5 | 1,800 |
| 2 | 0.1 | 780 |
| 2 | 0.2 | 880 |
| 2 | 0.5 | 2,400 |

I claim:

1. A cationic bitumen emulsion containing a thickener, wherein said thickener comprises at least one substance selected from the group consisting of non-ionic associative thickeners having the general formula:

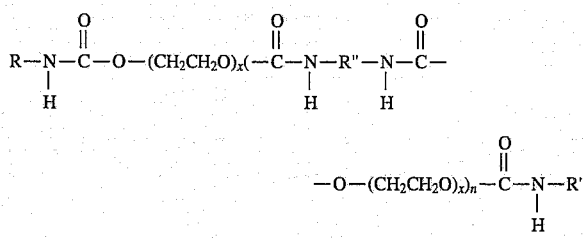

wherein

R and R' are the same or different and each represents a straight or branched alkyl group of 12–18 carbon atoms, R" is a saturated or unsaturated hydrocarbon chain of 7–36 carbon atoms, part of which chain may be closed to form a ring therein, x is a number from 90–500, and n is an integer from 1–4.

2. A bitumen emulsion according to claim 1, wherein said emulsion has a breaking additive supplied thereto in the form of a water-in-oil emulsion wherein an aqueous solution of a neutralizing substance is dispersed in an oil continuous phase.

3. A bitumen emulsion according to claim 2, wherein the neutralizing substance is selected from the group consisting of organic bases, basic salts of organic or inorganic acids and alkali metal hydroxides, which bases, salts and hydroxides are soluble in water but sparingly soluble or insoluble in oil.

4. A bitumen emulsion according to claim 2, wherein the neutralizing substance is dispersed in a mineral oil or in petroleum naphtha.

* * * * *